United States Patent [19]

Uchiyama et al.

[11] 3,744,393
[45] July 10, 1973

[54] PRESET STOP DEVICE FOR INTERCHANGEABLE LENS FOR SINGLE LENS REFLEX CAMERA

[75] Inventors: Takashi Uchiyama, Yokohama; Tetsuya Taguchi, Kanagawa, both of Japan

[73] Assignee: Canon Kabushiki Kaisha, Tokyo, Japan

[22] Filed: Dec. 20, 1971

[21] Appl. No.: 209,544

[30] Foreign Application Priority Data
Dec. 28, 1970 Japan.............................. 45/123917

[52] U.S. Cl. ..................... 95/64 B, 95/10 C, 95/42
[51] Int. Cl. ........................ G03b 9/07, G03b 17/14
[58] Field of Search ................ 95/10 C, 10 CD, 42, 95/64 B

[56] References Cited
UNITED STATES PATENTS
3,646,871  3/1972  Ramet ................................ 95/64 B
2,943,552  7/1960  Schiks ................................. 95/64 B FOREIGN PATENTS OR APPLICATIONS
1,028,537  8/1962  Japan ................................. 95/64 B
1,117,941  5/1956  France ............................... 95/64 B
758,353  10/1956  Great Britain ..................... 95/64 B

*Primary Examiner*—Joseph R. Peters, Jr.
*Attorney*—William R. Woodward

[57] ABSTRACT

A preset stop or aperture device in an interchangeable lens for a single-lens reflex camera comprises an aperture ring for stopping down aperture blades to a position determined by a preset ring. The aperture ring is driven by an electromagnetic drive means connected with a power supply circuit including a switch actuated by the aperture driving member of the camera.

10 Claims, 16 Drawing Figures

TAKASHI UCHIYAMA
TETSUYA TAGUCHI
INVENTORS

BY *Wm R Woodward*
ATTORNEY

TAKASHI UCHIYAMA
TETSUYA TAGUCHI
INVENTORS

TAKASHI UCHIYAMA
TETSUYA TAGUCHI
INVENTORS

BY *Wm R Woodward*
ATTORNEY

PRESET STOP DEVICE FOR INTERCHANGEABLE LENS FOR SINGLE LENS REFLEX CAMERA

BACKGROUND OF THE INVENTION

1. Field of the Invention

This invention relates to a preset aperture device in an interchangeable lens for single-lens reflex camera, and more particularly to such a device in which aperture blades are electrically driven so that the device may advantageously be used with ultra-telephoto lenses or the like whose aperture stop is greatly spaced apart from the camera body.

2. Description of the Prior Art

Generally, in a lens of long focal distance, the spacing from its aperture blades to the camera body to which the lens is attached is so great that, if the stop-down lever of the camera body and the aperture blades of the lens are mechanically connected together by an elongated lever or shaft as in the case of ordinary short lenses, the time required for the transmission of movement will be extended due to such factors as the friction, inertia, resilient deformation and so on occurring to the related members. This prevents the stop-down from being effected to a predetermined $f$-value during the time ranging from depression of shutter button to the beginning of exposure, thus often causing an irregular exposure in the image plane.

SUMMARY OF THE INVENTION

It is an object of the present invention to provide a preset aperture device which uses no such conventional transmission mechanism as described above but in which a stop-down signal from the camera is electrically transmitted to drive means to actuate aperture blades so as to accomplish a stop-down to a predetermined $f$-value within a very short time.

It is another object of the present invention to provide an electromagnetically driven preset aperture device which is provided with a preview switch to enable aperture blades to be stopped down to a predetermined value so that the depth of aperture may be observed while the power source is being checked.

It is still another object of the present invention to provide an electromagnetically driven preset aperture device which reliably operates with much reduced power consumption.

It is still another object of the present invention to provide an electromagnetically driven preset aperture device whose drive circuit is automatically opened upon removal of the interchangeable lens from the camera.

It is still another object of the present invention to provide an interchangeable lens provided with an electromagnetically driven preset aperture device which can be used without reforming a camera originally designed for use with a lens having a mechanical aperture transmission mechanism

BRIEF DESCRIPTION OF THE DRAWINGS

Various embodiments of the present invention will be described in detail hereunder in conjunction with the accompanying drawings, in which:

FIGS. 14 and 15 show two examples of the intermediate ring usable with the device of the present invention to effect close-ups or the like.

DESCRIPTION OF THE PREFERRED EMBODIMENTS

Figure 1:
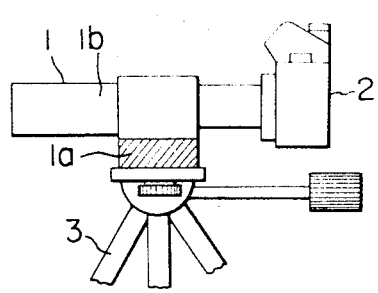
FIG. 1 is a schematic elevational view of a camera assembly including an interchangeable lens to which the preset aperture device of the present invention has been applied.

Referring to FIG. 1, there is shown the manner in which an interchangeable lens incorporating the preset aperture device of the present invention is used. Numeral 1 designates the interchangeable lens, and numeral 1–$a$ designates a casing for the power source, electric rotary machine, etc., which is attached integrally or detachably to a body tube 1–$b$. Numerals 2 and 3 denote a camera body and a tripod, respectively.

Figure 2:
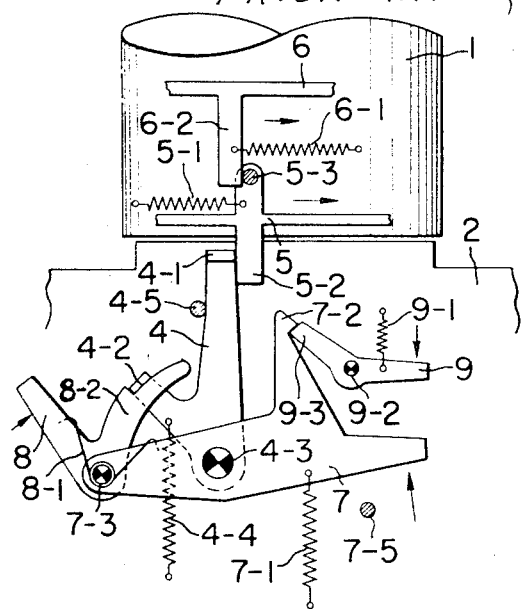
FIG. 2 shows an example of a mechanical preset aperture device according to the prior art.

FIG. 2 shows an example of the mechanical preset aperture device according to the prior art. The mounting of the interchangeable lens 1 with respect to the camera body 2 is accomplished by means of bayonets or screws, although not particularly shown. The camera body 2 is provided with a stop-down lever 4 and the interchangeable lens 1 is provided with an aperture transmission member 5 and an aperture ring 6. As will further be described, the stop-down lever 4 is adapted for the so-called quick-return action, that is, its arm portion 4–1 may be moved clockwise or rightwardly, as viewed in FIG. 2, by a strong spring force upon depression of a shutter button (not shown) and may be returned to its shown position by a spring force substantially weaker than said strong spring force upon completion of exposure. As the lever 4 is moved rightwardly, the aperture transmission member 5 is also moved rightwardly against the force of a spring 5–1 and in pursuance of the member 5, the aperture ring 6 restrained by a pin 5–3 is moved rightwardly by the force of a spring 6–1. The aperture ring 6 stops down aperture blades to an $f$-value preset by a preset ring or the like as will later be described with respect to FIG. 3, whereafter the rear end of a forward shutter diaphragm reaches the aperture area to start exposure. After a predetermined length of time, a rearward shutter diaphragm is closed to complete the exposure, whereafter the stop-down lever 4 is returned to its shown position and the transmission member 5 and aperture ring 6 are also returned to their respective shown positions.

The quick-return action of the stop-down lever 4 will now be described. The lever 4 has another arm portion 4–2 and a pivot 4–3. A charge lever 7 is pivotally mounted on the same pivot 4–3 and normally biased for clockwise rotation by a strong spring 7–1. The charge lever 7 has a pawl portion 7–2 and a pin 7–3, and its clockwise rotation is limited by a pin 7–5 secured to the camera body. A return lever 8 is pivotally connected to the charge lever 7 by means of the pin 7–3 and normally biased for counter-clockwise rotation by a spring 8–1. The return lever 8 has its pawl portion 8–2 engaged with the arm portion 4–2 of the stop-down lever 4. A release lever 9 is pivoted at 9–2 and normally biased for counter-clockwise rotation about the pivot 9–2 by a spring 9–1. The release lever 9 has its pawl portion 9–3 engaged with the pawl portion 7–2 of the charge lever 7 to prevent clockwise return of the charge lever 7. FIG. 2 shows a position in which all procedures for picture-taking such as film winding, shutter charge and the like have been completed.

Upon depression of the shutter button, the release lever 9 will be actuated in the direction of arrow to thereby release the engagement between the pawl portions 9–3 and 7–2, and the strong force of the spring 7–1 will overcome the force of the spring 4–4 to allow the levers 7, 8, 4 to rotate together until the lever 7 is stopped by the pin 7–5, whereby the aperture blades will be stopped down in the manner described above. The rearward shutter diaphragm will be closed to complete exposure, whereupon the lever 8 will be forced in the direction of arrow to release the engagement between the pawl portions 8–2 and 4–2, so that the force of the spring 4–4 will return the stop-down lever 4 to its shown position where it is stopped by the fixed pin 4–5.

In the above-described conventional preset aperture device using mechanical interlocking, it could readily be imagned that a very great distance from the aperture blades to the camera body 2 would lead to a correspondingly great length of the projection 6–2, which in turn would mean a great delay in the action of the aperture ring with respect to that of the stop-down lever 4. Actually, various designs have been adopted to reduce such delay in action which may occur in the device of the mechanical interlocking type, but the fact is that no sufficient success has been attained yet.

Embodiments of the preset aperture device according to the present invention will now be described with reference to FIGS. 3 and so forth.

Figure 3:
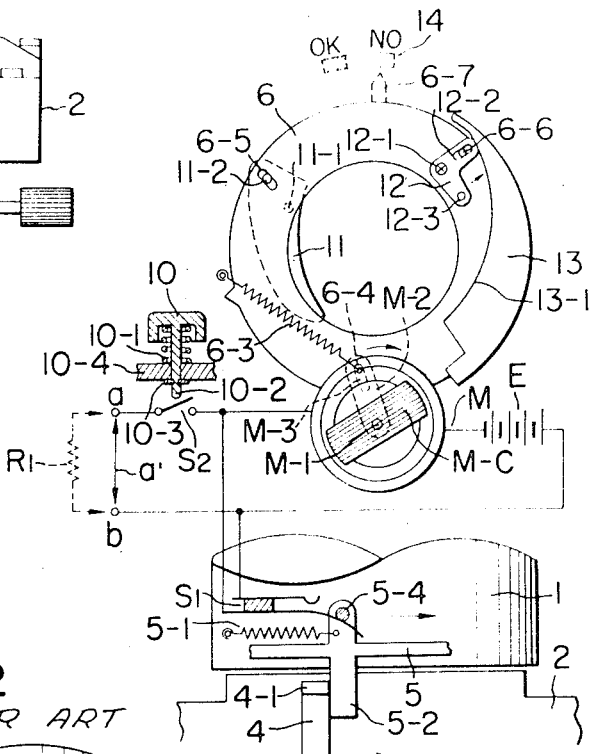
FIG. 3 schematically shows an embodiment of the preset aperture device and its electric circuit according to the present invention.

In FIG. 3, an insulating pin 5–4 is studded in transmission member 5 and a stop-down switch S1 is provided so as to open and close in accordance with the position of the pin 5–4. A normally open preview switch S2 is provided just below a preview button 10 so that it may be closed by the leg portion 10–2 of the button 10 when depressed against the force of its return spring 10–1. The button 10 is mounted on a wall 10–4 by means of an anti-slip fitting 10–3. The wall 10–4 forms a part of the interchageable lens or of the camera body 2. A power source E is provided whose magnitude is determined depending on the size of its load, i.e. aperture blades, and may usally correspond to the total power of two to four single type batteries 1.5 volt. In some cases, the power source may be provided by a capacitor or the like or a commercially available power source may be utilized in a modification. An electric rotary machine M is shown as being of a construction similar to an ordinary ammeter and its movable coil M-C is connected in the circuit. At the center of rotation M–1 of the movable coil M-C there is pivoted a lever M–2 which is formed with a slot M–3. A spring 6–3 has one end thereof secured to a pin 6–4 on the aperture ring 6 so as to bias this ring in the direction opposite to that shown in FIG. 2, i.e. in the direction for fully opening aperture blades. The pin 6–4 corresponds to the projection 6–2 in FIG. 2 and is loosely received in the slot M–3 of the lever M–2. Aperture blades 11 (only one of which is shown) may pivot in response to the rotation of the aperture ring 6, thereby varying the aperture defined by the aperture blades. The shown aperture blade 11 is pivotally mounted at 11–1 with respect to the frame of the lens and has a studded pin 11–2 loosely received in a slot 6–5 formed in the aperture ring 6. Another studded pin 6–6 on the aperture ring 6 is loosely received in a slot 12–2 formed at one end of an intermediate lever 12 pivotally mounted on a pin 12–1 supported by the lens frame. The intermediate lever 12 has a studded pin 12–3 at the other end thereof and is rotatable until the pin 12–3 strikes the caming surface 13–1 of a preset ring 13. Thus, the amount of rotation of the aperture ring 6 is controlled by the intermediate lever 12 in accordance with the set position (i.e. the angularly rotated position) of the preset ring 13, thereby determining the crrrent aperture (f-value). If required, a needle rotatable with the aperture ring 6 may be provided as indicated by an dashed line 6–7 and a display dial 14 may be provided in opposed relationship with the needle. Where the needle 6–7 and display dial 14 are provided, a resistor R1 should be connected in the circuit as shown in an dashed lines, replacing the short-circuiting connection between points a and b shown by the solid line a'.

In operation, the shutter button is depressed to release the shutter, whereupon the stop-down lever 4 of the camera body is moved rightwardly as in the case of FIG. 2, and accordingly the transmission member 5 of the interchangeable lens is moved rightwardly. The stop-down switch S1, which has been forced to open by the insulating pin 5–4, is now closed to permit a current to flow in the circuit of power source E — switch S1 — coil M-C to thereby cause clockwise rotation of the lever M–2, so that the aperture ring 6 is rotated counter-clockwise by the drive of the rotary machine M overcoming the force of the return spring 6–3. The amount of rotation of the aperture ring 6 is controlled by the intermediate lever 12 and preset ring 13 so that it is stopped at a point where the pin 12–3 strikes the camming surface 13–1, thus determining the aperture (f-value defined by the aperture blades 11). The descirbed stop-down can be fully completed within a predetermined length of time from the shutter release to the beginning of exposure, since the elongated projection, etc. shown in FIG. 2 are eliminated and only low inertia and friction are involved. When the shutter is closed, the stop-down lever 4, transmission member 5, etc. return to their respective shown positions as in the case of FIG. 2, so that the switch S1 is opened and the rotary machine M, aperture ring 6, intermediate lever 12, etc. are also returned to their shown positions to fully open the aperture blades 11. The force of the spring 6–3 may be relatively low without any inconvenience in practice.

The usage of the preview switch S2 will now be described. If the points a and b are short-circuited as indicated by the solid line $a'$ and the preview button 10 is depressed to close the switch S2, current will flow in the coil MC independently of the stop-down M-C S1 so that the aperture blades are stopped down in accordance with the set position of the preset ring 13 to thereby allow a preview to be effected. In other words, the depth of field and other factors for the set $f$-value can be confirmed through the viewfinder of the single-lens reflex camera.

If the resistor R1 is inserted as shown by the dashed line without short-circuiting the points $a$ and $b$, a current of value corresponding to the voltage of the power source E and the resistance value of the resistor R1 will flow in the coil M-C upon closing of the switch S2, and accordingly the rotary machine M, aperture ring 6, etc. will be rotated until the resultant rotational force thereof is balanced with the force of the spring 6—3. The needle 6–7 rotatable with aperture ring 6 and the display dial 14 are so arranged that they may be viewed from outside, because such arrangement will permit the photographer to check up the output of the rotary machine produced upon closing of the switch S2, thereby avoiding the occurrence of the inconvenience of failure of completion of stop-down within a predeterined time due to a possible voltage drop of the power source E. The value of the resistor R1 is preselected to a desired level. It should be noted that when the voltage of the power source is to be checked, the preset ring 13 must be rotated clockwise to retract the camming surface 13–1. When the resistor R1 is inserted in the circuit, it is likewise possible as an alternative to accomplish a preview by setting the preset ring 13 to a desired $f$-value. It is also possible to initially close the switch S2 and effect stop-down to a desired $f$-value, thereafter depress the shutter button to take a picture, and these procedures would enable normal picture-taking to occur irrespective of any substantial voltage drop in the power source. Alternatively, a change-over switch (not shown) may be inserted between the points $a$ and $b$ to interchangeably use the short-circuited circuit and the circuit including the resistor R1.

The embodiment described above with respect to FIG. 3 is not satisfactory in that the operation for preview and the operation for checking the source voltage cannot be effected at the same time. Further embodiments improved in this respect will now be described with reference to the circuit diagrams of FIGS. 4 and 5.

Figure 4:
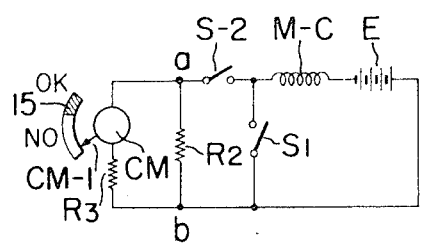
FIGS. 4 and 5 are diagrams showing further examples of the circuit.

Referring to FIG. 4, a small resistor R2 is parallel-connected with stop-down switch S1 through a preview switch S2 (which enables both the preview and the source voltage check-up to be effected at the same time), and an ammeter CM and a large resistor R3 are connected in series between points $a$ and $b$ and parallel-connected with the small resistor R2. A display dial 15 is provided so that it may be viewed from outside together with the needle CM–1 of the ammeter CM. The preset aperture device of the present embodiment is operable upon closing of the stop-down switch S1, as in the case of FIG. 3. The switch S1 is normally open, and when the preview switch S2 is closed with the switch S1 in its open position, current will flow through the circuit so that stop-down will be effected by the current flowing through the coil M-C. During that while a preview can be effected, and at the same time a current also flows to the ammeter CM, whose needle CM–1 is thus displaced in accordance with the voltage of the power source E so that the photographer can check up the source voltage by observing the display dial 15. The resistance value of the small resistor R2 is selected to the order of 1/10 of that of the coil M-C and the resistance value of the large resistor R3 puls the resistance value of the coil of the ammeter CM is selected to the order of 1000 times that of the small resistor R2. By this, the current flowing through the coil M-C upon closing of the switch S2 becomes closely approximate in value to the current flowing through the same coil upon closing of the switch S1, and thus, the source voltage check can be effected substantially under the same conditions as when stop-down is actually carried out with the switch S1 closed, thereby enhancing the accuracy of the check. When a heavy current is taken out of the battery used as power source, it is usally the case that the voltage, i.e. the closed-circuit voltage is sharply decreased during its use. Therefore, the closed-circuit voltage as measured in such case is widely different from the closed-circuit voltage as measured by taking out an extremely small current, and in addition, a problem would be encountered that the difference between such measured voltages is variable with the type of the current and this makes it difficult to find a correspondence therebetween. In this sense, it is ideal to check the source voltage by actually flowing a current of a value substantially equal to that during the actual use, as is done in the present embodiment. Since the small resistor R2 and the sum of the resistances of the large resistor R3 and ammeter's coil are parallel-connected between the points $a$ and $b$, the value of the current flowing through the coil M-C upon closing of the switch S2 is determined substantially by the closed-circuit voltage of the power source E and the resistance values of the coil M-C and small resistor R2. The described arrangement is very convenient in that preview and source voltage check can both be effected simply by closing the switch S2.

Figure 5:
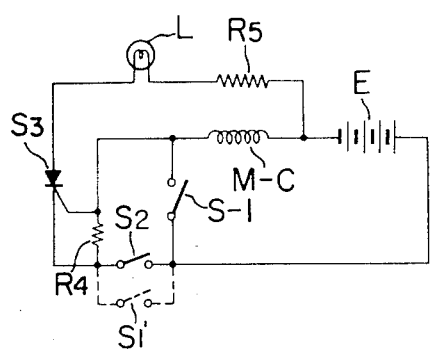

Another embodiment shown in FIG. 5 will now be described. A small resistor R4 is connected between the terminals of a switching element (SCR) S3, and a resistor R5 is provided to limit the value of the current flowing to a lamp L. A switch S1', indicated by dotted line, is an alternative connection for stop-down switch S1.

In operation, the stop-down switch S1 is similar to that shown in the previous embodiment. Stop-down is also effected by closing the preview switch S2. At that time, there is produced across the small resistor R4 a potential difference corresponding to the value of the current flowing through the resistor R4. When the output of power source E is sufficient so that the heavy current necessary to complete stop-down within a predetermined time may flow through the circuit, the switching element S3 is rendered conductive by the resistor R4 to turn on the lamp L. When the preview button 10 is released to open the switch S2, the lamp L is turned off. If the power source E is too much deteriorated to provide a sufficient output, the switching element S3 would not conduct to turn on the lamp L even if the switch S2 is closed. In this way, by closing the switch S2 to turn on the lamp L, source voltage check and preview can be effected at the same time.

Where the stop-down switch S1 is eliminated from its shown position and instead, the switch S1' is connected parallel with the switch S2 as shown by the dashed line, the lamp L will turn on at every preset stop-down operation unless the power source is deteriorated. This modified arrangement is more convenient in that whether a picture-taking action has been properly carried out or not can be confirmed even at locations distant from the camera and that the points of time at which the picture-taking has begun and completed can be known. The lamp L may be disposed at a location on the interchangeable lens or on the camera body which can be viewed from outside, but alternatively it may be disposed so as to be preceived within the viewfinder in the camera body. In those cases where the power source has been deteriorated to require a longer time for stop-down, the switch S2 may be initially closed to effect stop-down and then a picture may be taken.

Figure 6:
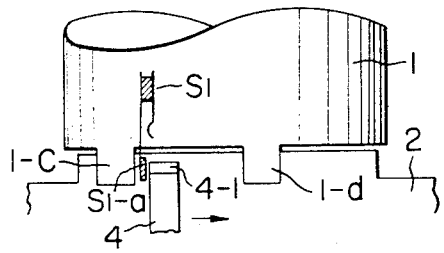
FIGS. 6 and 7 show further embodiments of the present invention.
Figure 7:
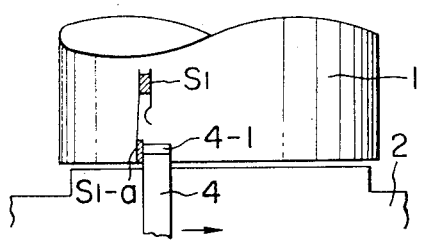

With reference to FIGS. 6 and 7, description will now be made of an example in which the transmission member 5 shown in FIG. 3 is omitted and the stop-down lever 4 of the camera body is directly associated with the stop-down switch S1.

It is generally the case with an interchangeable lens that after removal of the lens from the camera body, damage is imparted to any member of insufficient mechanical strength which may then be projected at the rear end of the lens where the lens is connected to the camera body. For this reason, the transmission member shown in FIG. 3 is formed with such a degree of mechanical strength as would create no problem in practical use, but such transmission member 5 can be omitted in the cases as described hereunder.

Referring to FIG. 6, the interchangeable lens 1 has projections 1–c and 1–d formed at the rear end thereof for protecting the contact members of the switch S1. Of course, these projections must neither interfere with the movement of the stop-down lever 4 of the camera body during the picture-taking nor strike any other member of the camera body. An insulating member S1–a is secured to the tip end of one of the contact members of the stop-down switch S1 which is pressure-contacted by the arm portion 4–1 of the stop-down lever 4, and as in the embodiments already described, the switch S1 is closed and opened by the reciprocal movement of the stop-down lever 4.

FIG 7 shows an example in which the arm portion 4–1 of the stop-down lever 4 in the camera body is projected beyond the fore end of the lens mounting portion of the camera body. In this example again, the Intermediate transmission member 5 may be omitted as in the case of FIG. 6.

When a long-time exposure ranging from one second to several seconds is to be effected with the embodiments described above, a heavy current necessary to stop down the aperture blades 11 within a short time is continuously supplied to the electric rotary machine M throughout the exposure time, and this would lead to serious consumption of the power source. Such power consumption may be prevented by improved embodiments which will be described hereunder with reference to FIGS. 8 to 10.

Figure 8:
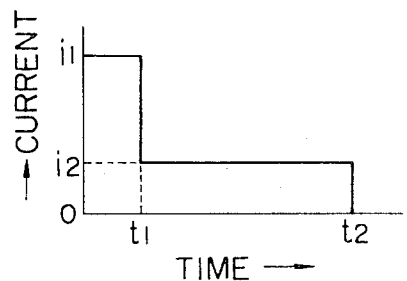
FIG. 8 is a graph illustrating the relationship between the time lapse after closing of the stop-down switch and the current flowing through the coil of the electromagnetic drive means.

In the graph of FIG. 8, the abscissa represents the lapse of time after the closing of the stop-down switch S1 and the ordinate represents the value of the current flowing through the coil M-C of the rotary machine M. It is seen that during a certain period of time $t_1$ a heavy current $i_1$ necessary to quickly close the aperture blades is supplied to the rotary machine and from then to the point of time $t_2$ at which exposure is completed, a small current $i_2$ necessary to overcome the force of the return spring 6–3 of the aperture ring 6 is supplied to the rotary machine. Thus, the supply of a heavy current is only required till the point of time $t_1$ irrespective of the length of exposure time and only a small current is required from then to the point of time $t_2$. This of course saves the consumption of the power source.

Figure 9:
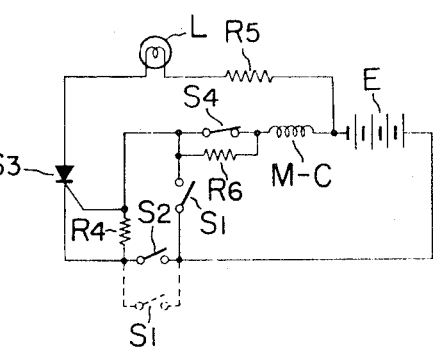
FIG. 9 diagrammatically shows a further example of the electric circuit.

FIG. 9 shows an example of the circuit arrangement for realizing the foregoing effect. The shown circuit includes a current limit switch S4 and a current limit resistor R6. In the other respects, this circuit is similar to that shown in FIG. 5. Switch S1 is normally open and switch S4 is normally closed. Upon depression of shutter button, the switch S1 is closed to pass a heavy current to the coil M-C to stop down the aperture blades. After a certain short period of time $t_1$, the current limit switch S4 is opened and the resistor R6 is operatively connected in the circuit of the coil M-C, thus reducing the amount of current flowing to that coil. The resistance value of the resistor R6 may be selected so that the current value $i_2$ at that moment is of the order of one-thirds of the current value $i_1$ reuired for quickly closing the aperture blades, but the current value $i_2$ may further be reduced depending on the force of the aforesaid return spring 6–3. Since the switch S4 is normally closed, closing of the preview switch S2 enables the voltage of the power source E to be checked up just in the same way as described with respect to FIG. 5. Alternatively, such an arrangement is possible that stop-down switch S1 is replaced by switch S1' as in the case of FIG. 5, whereby lamp L may be turned on during each exposure as long as the power source maintains a sufficient voltage.

Figure 10:
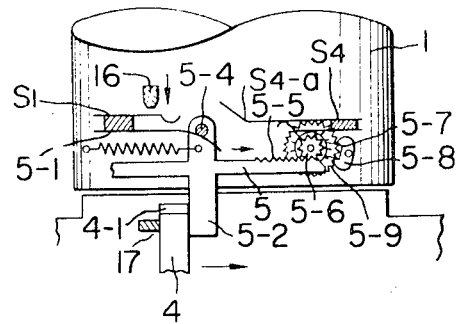
FIGS. 10 and 11 show further embodiments of the present invention.

FIG. 10 shows another embodiment in which switch $S_4$ is opened and closed together with switch S1. As shown, the switch S4 is normally closed, but as the transmission member 5 and insulating pin 5–4 are moved together rightwardly, as viewed in the figure, in response to the depression of shutter button, the contact S4–a is raised to open the switch S4. In this way, the consumption of the power source during a long-time exposure can be effectively saved. However, if the stop-down lever 4 of the camera body is of the type which is driven by the mechanism as shown in FIG. 2 so as to quickly move the transmission member 5 rightwardly, then it would be possible that before the aperture blades have been stopped down, the current limit switch S4 is opened to reduce the output of the rotary machine M and prevent the stop-down from being duly completed before the initiation of the exposure by the shutter. As seen in FIG. 10, such undesirable possibility may be avoided by providing the transmssion member 5 with a rack 5—5, mounting a pinion 5–6 engageable with the rack on the lens frame, securing a clutch spring 5–4 to the pinion 5–7 and engaging it with a mating groove formed in an escape wheel 5–8 to thereby establish a clutch-connection of rotational directively between the pinion 5–6 and the escape wheel 5–8, and engaging a pallet 5–9 with the escape wheel 5–9. With such an arrangement, a brake force acts on the transmission member 5 when the stop-down lever 4 drives the transmission member 5 rightwardly with the aid of the strong spring force, whereby the time passed until the switch S4 is opened by the insulating pin 5–4 is controlled to a desired length. In this way, an accord can be established between the time required for the rotary machine M to effect stop-down and the time $t_1$ during which a heavy current flows through the coil. A value of $t_1$ somewhat greater than the required time for stop-down would be safer, and even too great a value for the time $t_1$ would result in no functional trouble. In the above-described embodiment, the point of time at which the switch S4 is opened has been controlled by a mechanical timer (governor), but it is also feasible to accomplish the control by using an electric timer (delay circuit) which starts to operate upon closing of the switch S1. Alternatively, no timer or like means will be required if the current limit switch S4 is not associated with the transmission member 5 as shown, but with the rotary machine or the like so that the switch is opened upon completion of stop-down. In the embodiment shown in FIG. 10, when the stop-down lever 4 has returned to its shown position upon completion of the exposure, the transmission member 5 will be returned to its shown position by the force of the spring 5–1 without any delay because in that direction the clutch spring 5–7 does not drive the escapement governor 5–8, 5–9.

FIG. 10 further includes a preview member 16 of insulating material which is associated with the preview button so that it is moved in the direction of arrow in response to depression of the preview button. Such arrangement eliminates the need to provide switch S2 and enables switch S1 to serve also as switch S2 in effecting a preview. If the switches S1 and S1' in FIG. 9 are eliminated and a stop-down and preview switch as shown in FIG. 10 is inserted instead of the switch S2, it will be possible to check the source voltage simultaneously with the movement of the preview member 16. In some cameras, camera body is provided with a stop-down photometry operating portion for metering the brightness of object, said operating portion being operable to stop down the aperture blades of the interchangeable lens to accomplish photometry. In FIG. 10, numeral 17 designates a stop-down photometry member associated with the aforesaid operating portion to force the lever 4 rightwardly upon operation of that portion. By such operation, the switch S1 is closed to stop down the aperture blades to a preset value, and this holds true with the device of the present invention as well as with the mechanical preset devices.

Figure 11:
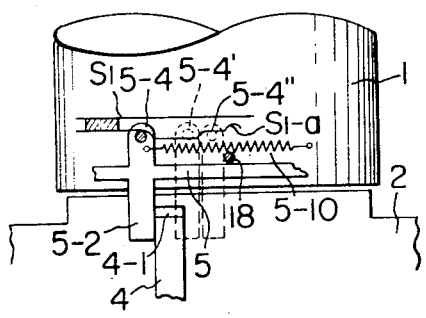

Referring to FIG. 11, there is shown a modification in which the operative association between the stop-down lever of the camera body and the transmission member of the lens is different from that shown in the previous embodiments. Conversely to the described embodiments, the projection 5–2 of the transmission member 5 is normally biased rightwardly by spring 5–10 into contact with the arm portion 4–1 of the stop-down lever 4 at the left-hand side thereof. In such a case, if the stop-down switch S1 is provided in the manner as shown in FIG. 3 or 10, an inconvenience will be encountered that even after the removal of the interchangeable lens 1 from the camera body 2 the switch S1 remains closed, i.e. current continues to flow through the circuit. In order to avoid this, there may be provided a power switch which may be manually opened when the interchangeable lens is removed from the camera body, but this might raise a problem that the user may forget to carry out the manual operation of the power switch. An embodiment descrbed below eliminates the need for such manual operation. During exposure, the reciprocal movement of the stop-down lever 4 causes the insulating pin 5–4 to reciprocate between the members 5–4 and 5–4' in FIG. 11. Again in this case, the stop-down switch S1 is opened and closed in response to such reciprocal mevement, although the switch S1 in this embodiment is somewhat different in configuration from that shown in the previous embodiments. Upon removal of the lens 1 from the camera body, the transmission member 5, whose range of movement has so far been restricted by the stop-down lever 4, is now permitted to move until it strikes a stop member 18 fixed to the lens frame, i.e. the insulating pin is moved to a position indicated at 5–4'', where the insulating pin faces the deep stepped portion of the switch contact S1–a to thereby open the switch S1.

Such arrangement is convenient in that the circuit is automatically opened upon removal of the lens from the camera body.

In the device wherein stop-down is effected by electric power as described hitherto, it would be more advantageous to leave the possibility of manual stop-down operation being done in preparation for possible adversities such as unavailability of batteries for the power source or deterioration of the power source.

Figure 12:
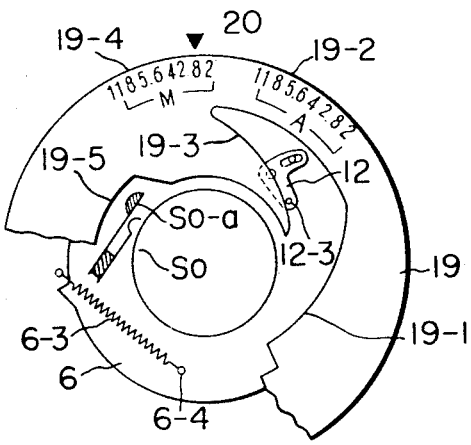
FIG. 12 shows a further embodiment of the present invention which permits both automatic and manual stop-down operations.
Figure 13:
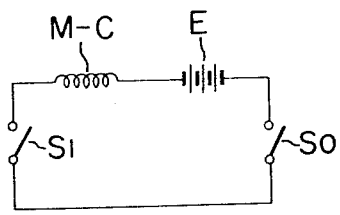
FIG. 13 shows the electric circuit therefor.

FIG. 12 and 13 illustrate an embodiment which permits manual stop-down operation as well. These figures only show modified parts and other essential parts considered necessary for the purpose of description. In FIG. 12, an aperture setting ring 19 serves not only as the preset ring 13 shown in FIG. 3 but also as means for manual stop-down. The ring 19 includes a preset camming surface 19–1 and a corresponding preset aperture scale 19–2. The ring 19 further includes a manual stop-down camming surface 19–3 and a corresponding manual stop-down scale 19–4. A power switch SO is provided so that when it is open the entire circuit is in inoperative position, as shown in FIG. 13.

The shown position is that in which the manual stop-down is adopted. As shown, an insulating member $S_0$–a fixed to one of the contacts of the power switch $S_0$ is received in a recess 19–5 formed in the aperture setting ring 19, so that the switch $S_0$ is open and accordingly the electric circuit is inoperative. Aperture ring 6 is connected to an electirc rotary machine (not shown there) by means of a pin 6–4, but with the power switch $S_0$ being open, the only extraneous force now imparted to the aperture ring 6 is the force of return spring 6 –3. By the force of this spring 6–3, the pin 12–3 of intemediate lever 12 is biased into contact with the manual stop-down camming surface 19–3 to restrict the amount of rotation of the aperture ring 6, and therefore the opening defined by aperture blades assumes an f-value corresponding to a fixed reference index 20. Thus, manual stop-down can be effected. When preset stop-down is to be effected, the preset aperture scale 19–2 is adjusted to the reference index 20, whereafter the power switch $S_0$ is closed to enable preset stop-down to be effected by means of the rotary machine and the camming surface 19–1.

Figure 14:
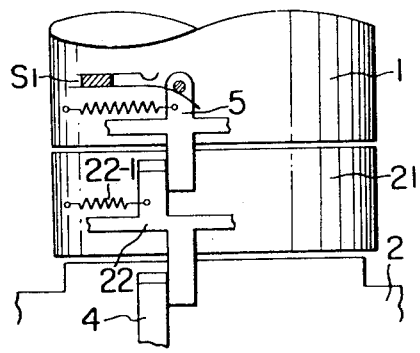

With reference and FIGS. 14 to 15, examples of the intermediate ring used for close-ups or the like will now be described. FIG. 14 shows an example in which a signal from the stop-down lever in the camera body is mechanically transmitted to the interchangeable lens. The intermediate ring is designated by numeral 21, and a signal transmission member 22 is biased leftwardly by spring 22–1. Apparently, this arrangement will ensure the signal from the stop-down lever 4 to be simply and reliably transmitted to the lens unit's transmission member 5.

Figure 15:
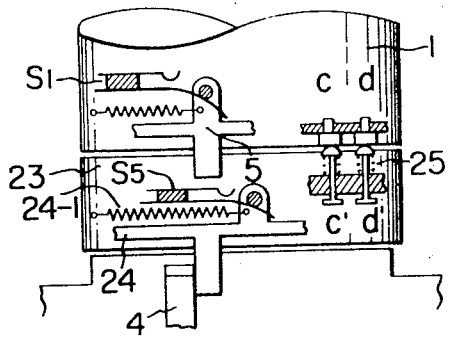
Figure 16:
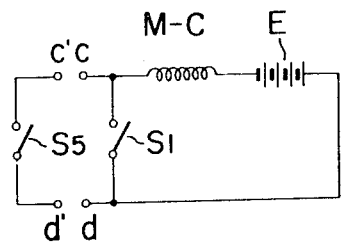
FIG. 16 shows the electrical connection in FIG. 15.

FIG. 15 shows another example of the intermediate ring in which the signal is electrically transmitted, and FIG. 16 shows the circuit therefore. In FIG. 15, the intermediate ring is designated by numeral 23, and signal transmission member 24 leftwardly biased by spring 24-1 is similar to the lens unit's transmission member 5. Signal transmission switch S5 is connected with the connection contact $c'$ and $d'$ in the intermediate ring. These contacts $c'$ and $d'$ are urged into contact with the connection contacts $c$ and $d$ in the interchangeable lens, which in turn are connected with stop-down switch S1. These relations are illustrated in FIG. 16. It will be apparent from this arrangement that switch S5 is closed and opened in synchronism with the reciprocal movement of the stop-down lever 4 to thereby enable stop-down to be effected by the current flowing through the coil M-C, as in the case where switch S1 is closed and opened.

As will be appreciated from the foregoing description of the various embodiments shown in FIGS. 1 to 16, the preset aperture device according to the present invention enables safe and reliable stop-down to be accomplished by a very simple construction in various lenses including ultra-telephoto lens or the like having a great spacing from its aperture blades to the camera body, and only requires a very much simplified construction of the intermediate ring and the like. Moreover, operation of the preview switch ensures preview and accurate source voltage check-up to be carried out at the same time. These advantages are highly convenient to the users.

We claim:

1. A preset aperture device in a lens for a single-lens reflex camera comprising:
   an aperture ring rotatably supported within a barrel;
   aperture blades engaged with said aperture ring to vary the aperture defined by said blades in accordance with the rotation of said ring;
   a member for stopping the rotation of said aperture ring;
   an aperture preset ring for pre-selecting the position at which said aperture ring is stopped;
   electromagnetic drive means having a coil connected with a power source and with a first switch adapted to open and close in response to an aperture driving member provided in the camera;
   an aperture transmission member engaged with said aperture driving member of the camera, said transmission member being spring-biased to stay at an open position for maintaining said switch in its open position; and
   spring means for biasing said electromagnetic drive means in a direction for opening the aperture;
   said electromagnetic drive means being operatively connected to said aperture ring so as to rotate said aperture ring in a closing direction when said switch is closed.

2. A preset aperture device according to claim 1, further comprising a preview switch for short-circuiting a circuit including said power source and said electromagnetic drive means.

3. A preset aperture device according to claim 1, further comprising power source check-up means connected through a resistor to a circuit including said power source and said electromagnetic drive means.

4. A preset aperture device according to claim 3, wherein said power source check-up means is driven by said preview switch.

5. A preset aperture device according to claim 3, wherein said power source check-up means includes a lamp and a switching element.

6. A preset aperture device according to claim 3, wherein said power source check-up means includes an ammeter.

7. A preset aperture device according to claim 1, wherein the circuit including said power source and said electromagnetic drive means includes a second switch connected in series with said first switch associated with said aperture driving member, and a resistor connected parallel with said second switch, said second switch being adapted to open in response to the stop-down motion of said aperture transmission member.

8. A preset aperture device according to claim 7, further comprising delay means provided between said first and said second switch.

9. A preset aperture device according to claim 1, wherein said electromagnetic drive means is operatively associated with said aperture driving member of the camera via the aperture signal transmission member of an intermediate ring.

10. A preset aperture device for single-lens reflex camera comprising in combination a camera having an aperture driving member reciprocating in connection with the shutter release of the camera and an interchangeable lens which comprises;
    an aperture ring rotabably supported within a barrel;
    aperture blades engaged with said aperture ring to vary the aperture defined by said blades in accordance with the rotation of said ring;
    a member for stopping the rotation of said aperture ring;
    an aperture preset ring for pre-selecting the position at which said aperture ring is stopped;
    electomagnetic drive means operatively connected with said aperture ring;
    a switching means provided in a circuit including said electromagnetic drive means and a power source, said switching means being actuated in response to the movement of said aperture driving member, and permitting, when closed, the rotation of said aperture ring in a closing direction through said electromagnetic drive means;
    spring means for biasing said electromagnetic drive means in a direction for opening the aperture.

* * * * *